United States Patent
Ryu et al.

(10) Patent No.: US 8,732,691 B2
(45) Date of Patent: May 20, 2014

(54) METHOD FOR INSTALLING APPLICATION IN PORTABLE TERMINAL

(75) Inventors: Sung-Hak Ryu, Daegu (KR); Byeong-Gyun You, Gyeongsangbuk-do (KR); Cheong-Rim Choi, Gyeongsangbuk-do (KR); Chae-Whan Lim, Daegu (KR); Jeong-Wook Seo, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 87 days.

(21) Appl. No.: 13/528,928

(22) Filed: Jun. 21, 2012

(65) Prior Publication Data

US 2012/0331457 A1    Dec. 27, 2012

(30) Foreign Application Priority Data

Jun. 21, 2011    (KR) .................. 10-2011-0060394

(51) Int. Cl.
*G06F 9/445*    (2006.01)

(52) U.S. Cl.
USPC .......................................................... 717/175

(58) Field of Classification Search
CPC ........................................................ G06F 8/61
USPC .......................................................... 717/175
See application file for complete search history.

(56) References Cited

U.S. PATENT DOCUMENTS

| | | | |
|---|---|---|---|
| 2011/0161880 A1* | 6/2011 | Abbott et al. | 715/823 |
| 2011/0246904 A1* | 10/2011 | Pinto et al. | 715/740 |
| 2012/0184255 A1* | 7/2012 | Macaluso | 455/414.3 |
| 2012/0331457 A1* | 12/2012 | Ryu et al. | 717/175 |
| 2013/0122861 A1* | 5/2013 | Kim et al. | 455/410 |
| 2013/0167242 A1* | 6/2013 | Paliwal | 726/26 |
| 2013/0225150 A1* | 8/2013 | Macaluso | 455/418 |
| 2013/0283260 A1* | 10/2013 | Chen | 717/174 |

* cited by examiner

*Primary Examiner* — Philip Wang (74) *Attorney, Agent, or Firm* — Cha & Reiter, LLC (57) ABSTRACT

A method for installing an application in a portable terminal includes acquiring a screen image of another portable terminal and acquiring information about at least one applications from the acquired screen image, displaying a list of the at least one applications whose information is acquired, and requesting and receiving an installation file of an application selected by a user from the displayed list, and installing the selected application by using the received installation file.

17 Claims, 4 Drawing Sheets

METHOD FOR INSTALLING APPLICATION IN PORTABLE TERMINAL

CLAIM OF PRIORITY

This application claims the benefit under 35 U.S.C. §119(a) of a Korean Patent Application filed in the Korean Intellectual Property Office on Jun. 21, 2011 and assigned Serial No. 10-2011-0060394, the entire disclosure of which is hereby incorporated by reference in its entirety.

BACKGROUND OF THE INVENTION

1. Field of the Invention

The present invention relates to a portable terminal and applications (i.e. "apps) therefor. More particularly, the present invention relates to a method for easily and conveniently installing an application in a portable terminal.

2. Description of the Related Art

Portable terminals, which include but are not limited to smart phones, tablets, etc., have come into wide use. Through the operation of applications, such portable terminals have provided various useful functions to users through applications. In other words, recent portable terminals provide various complex functions as well as simple voice communication, and have evolved into multi-function apparatuses allowing use of information in various forms.

The diversification of functions implemented in a portable terminal refers to diversification of types of applications capable of selecting and executing those functions and an increase in the number of icons (corresponding to the applications) which allow users to access the applications. As the number of icons increases, the user needs to efficiently manage the icons because the display screen is relatively small for portable devices and a general list of icons would appear cluttered on the display. A conventional portable terminal provides a plurality of screens in each of which icons corresponding to predetermined menus or applications are arranged, and when necessary, the user moves to another screen to execute a predetermined menu or application. In other words, in conventional devices the icons corresponding to necessary menus or applications are arranged and used screen-by-screen.

However, as the number of types of applications increases, the user cannot know all the useful applications. Consequently, the user usually installs an application recommended as useful by an acquaintance or accesses a separate application providing server to install a recommended application.

The user, while viewing a screen of a portable terminal of an acquaintance (i.e., another portable terminal), may desire to install an application corresponding to an icon disposed on the screen. Conventionally, to install a desired application, the user has to experience a complex process of accessing a separate application providing server and inputting a name of the desired application to search for the desired application.

Therefore, when desiring to install an application corresponding to an icon disposed on a screen of a portable terminal of an acquaintance, the needs to be provided with a function of rapidly and conveniently installing the application.

SUMMARY OF THE INVENTION

Accordingly, an exemplary aspect of the present invention permits a user to conveniently and rapidly install an application in a user's portable terminal that is the same application as that installed in a portable terminal of another user.

According to an exemplary aspect of the present invention, there is provided a method for installing an application in a portable terminal. The method preferably includes acquiring a screen image of another portable terminal and acquiring information about at least one applications from the acquired screen image, displaying a list of the at least one applications whose information is acquired, and requesting and receiving an installation file of an application selected by a user from the displayed list, and installing the selected application by using the received installation file.

BRIEF DESCRIPTION OF THE DRAWINGS

The above and other exemplary features and advantages of an exemplary embodiment of the present invention will be more apparent from the following detailed description taken in conjunction with the accompanying drawings, in which.

DETAILED DESCRIPTION

A portable terminal according to an exemplary embodiment of the present invention (including a portable terminal A and a portable terminal B) is a mobile electronic apparatus which is easy to carry, examples of which may include but are in no way limited to a video phone, a portable phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) device, an Electronic(E)-book, a portable computer (a notebook, a tablet, etc.), a digital camera, and so forth, just to name a few non-limiting possible devices that can benefit from the presently claimed invention. The portable terminal according to an exemplary embodiment of the present invention (the portable terminal A and the portable terminal B) will now be described with reference to FIG. 1.

Figure 1:
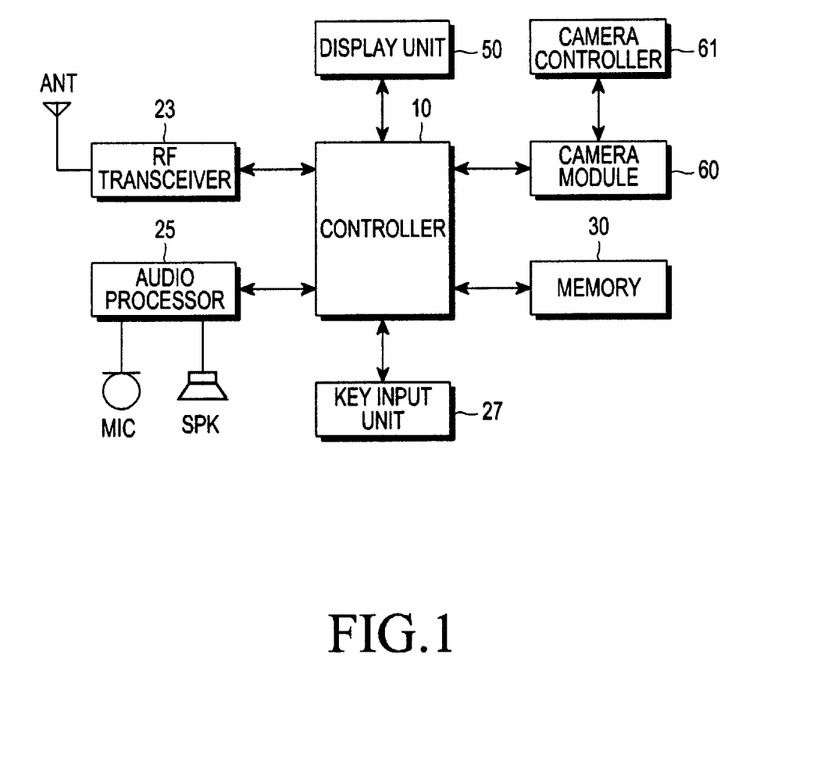
FIG. 1 is a block diagram of a portable terminal according to an exemplary embodiment of the present invention.

A Radio Frequency (RF) transceiver 23 preferably includes an RF unit and a modem. The RF unit comprises an RF transmitter for up-converting a frequency of a transmission signal and amplifying the up-converted transmission signal and an RF receiver for low-noise-amplifying a received signal and down-converting a frequency of the low-noise-amplified signal. The modem includes a transmitter for encoding and modulating the transmission signal and a receiver for demodulating and decoding the received signal.

An audio processor 25 preferably comprises a codec including a data codec and an audio codec. The data codec processes packet data and the audio codec processes audio signals like voice and a multimedia file. The audio processor 25 also provides A/D and D/A conversion, for example, by converting a digital audio signal received from the modem into an analog audio signal through the audio codec and reproduces the analog audio signal, or converting an analog audio signal generated from a microphone (MIC) into a digital audio signal through the audio codec and transmits the digital audio signal to the modem. The codec may be separately provided or may be included in a controller 10.

A key input unit 27 may include keys for inputting numeric and character information and function keys or a touch pad for setting various functions. The input unit may comprise an actual or a virtual keyboard, and in the case of a virtual keyboard would be a logical portion of the display unit. When a display unit 50 is implemented with a touch screen of a capacitive type, a resistive type, etc., the key input unit 27 may include only preset minimum keys, such that the display unit 50 may replace a part of the key input function of the key input unit 27.

Through the key input unit 27 according to an exemplary embodiment of the present invention, a user inputs a predetermined key to request another portable terminal to transmit its screen image (e.g., a screen image on which icons are disposed) for reception of the screen image of another portable terminal According to an exemplary embodiment of the present invention, by utilizing the key input unit 27, the user drives the camera module 60 to capture the screen image of another portable terminal (e.g., the screen image on which icons are disposed) or check the screen image of another portable terminal on a preview screen.

With continued reference to FIG. 1, the memory 30, which comprises a non-transitory machine readable medium, may include program and data memories. The program memory stores programs comprised of machine executable code for controlling a general operation of the portable terminal. In addition to the memory 30, the device may include an external memory such as a Compact Flash (CF), a Secure Digital (SD), a Micro Secure Digital (Micro-SD), a Mini-SD, an Extreme Digital (xD), a memory stick, or the like, which are connected via an interface. The memory 30 may also include a disk such as a Hard Disk Drive (HDD), a Solid State Disk (SSD), optical drive, etc.

The display unit 50 preferably comprises a Liquid Crystal Display (LCD), or Passive Matrix Organic Light Emitting Diode (PMOLED) or Active Matrix OLED (AMOLED) as an OLED, and outputs display information generated in the portable terminal Virtually any thin film technology screen can be used. The display unit 50 may include a touch screen of a capacitive type, a resistive type, surface acoustic wave or the like to operate as an input unit for controlling the portable terminal, together with the key input unit 27.

The display unit 50 according to an exemplary embodiment of the present invention displays a plurality of screens in each of which at least one icons corresponding to menus or applications are arranged and displayed. When an icon corresponding to a newly installed application or menu is generated, the generated icon is disposed and displayed on a predetermined screen (e.g., a screen which allows arrangement of icons) through the display unit 50 according to an exemplary embodiment of the present invention.

A camera module 60 typically including an image pickup sensor or the like converts an optical signal input (or captured) through lenses (not shown) into an electric image signal and processes the electric image signal, and the user may capture a (moving or still) image through the camera module 60. The camera module 60 may include a lens (not shown) for collecting light and delivering the light to a camera sensor (not shown), the camera sensor for converting an optical signal captured during capturing of an image into an electric image signal, a camera memory for temporarily storing the captured image, and a flash for providing a proper amount of light according to surrounding conditions at the time of image capturing, and a camera controller 61, which preferably comprises a microprocessor for controlling overall operation of the camera module 60 and converting an analog image signal captured through the camera sensor into digital data. With regard to the camera module 60, the lens may comprise one or more of a series of lenses, and the camera sensor may be a Charge Coupled Device (CCD) sensor or a Complementary Metal-Oxide Semiconductor (CMOS) sensor. The camera controller 61 may be implemented with an Image Signal Processor (ISP) or a Digital Signal Processor (DSP), and the camera sensor and the camera controller 61 may be implemented separately as shown or integrally. The flash is a camera accessory which uses a discharge light as a photographing light source that is instantly generated when a high-voltage direct current is applied to, for example, a xenon discharge tube. The flash is usually referred to as a strobo, which is a product name, and/or is also referred to as an electronic flash or speed flash. The flash uses a layer-built cell as a power source to boost the voltage to a necessary high voltage. The flash may be classified into a clip-on type having a Guide Number (GN) of 14-30 or a clip type having a GN of 30-50. The flash has a very short light-emission time of $\frac{1}{1000}$ second and is very bright like a white light (natural light), such that the flash serves as a main light source of an artificial light.

The camera controller 61 controls the camera module 60 to output an image captured (or input) through the lens and the camera sensor as a photographing image to the controller 10. More particularly, the camera controller 61 includes a codec for capturing an image according to settings (e.g., a capturing resolution, an aperture value, a shutter speed, a color temperature, etc.) and compressing the captured image into a format that is processed by the controller 10 of the portable terminal, such as a still-image format such, for example, as a Joint Photographic Coding Experts Group (JPEG) format or a moving-image format such as a Moving Picture Experts Group (MPEG) format. The camera controller 61 outputs the image compressed into the JPEG format or the MPEG format through the codec to the controller 10 of the portable terminal.

With continued reference to FIG. 1, the camera controller 61 may control the camera module 60 to output an image to be captured (or input) through the lens and the camera sensor as a preview screen (or image) to the controller 10. For example, the camera controller 61 converts an image signal captured through the camera sensor, etc. into digital data, converts the converted digital data into a YUV format suitable to be displayed as the preview screen, and outputs the YUV-format digital data to the controller 10. The controller 10 receives the digital data and outputs it through the display unit 50. Herein, the YUV format expresses a pixel with a Y component (luminance) and U(Cb) and V(Cr) components (Chrominance), and is suitable for displaying a preview-screen image because of allowing transmission with a smaller bandwidth than in a general RGB format.

According to an exemplary aspect of the present invention, the user may view a screen image of a portable terminal of another user (i.e., another portable terminal) as a preview screen, or alternative may capture the screen image by using the camera module 60 according to an exemplary embodiment of the present invention. The controller of the portable terminal of the user may then check information of at least one applications disposed on a screen image of another portable terminal by using the image input as the preview screen (e.g., the screen image of another portable terminal) or the captured image (e.g., the screen image of another portable terminal).

The controller 10, which preferably includes a processor or microprocessor, controls the overall operation of the portable terminal according to an exemplary embodiment of the present invention (each of the portable terminal A and the portable terminal B), and may change and control operations of the portable terminal according to a user input made through the key input unit 27 or the display unit 50.

In addition, according to an exemplary embodiment of the present invention, the controller 10 acquires a screen image of another portable terminal at the request of the user, acquires information about at least one of the applications (which is typically represented by an icon) from the acquired screen image, displays an application list regarding the information-acquired applications, requests and receives an installation file of an application selected by the user from the displayed application list, and installs the received installation file of the application. The controller 10, according to an exemplary embodiment of the present invention, upon receiving a request for a screen shot of a predetermined screen, generates a screen shot image of the predetermined screen (with user's consent), and transmits the screen shot image to a requesting portable terminal. For example, the controller 10 according to an embodiment of the present invention generates a screen shot image of a currently used (activated screen) or all screens (e.g., seven screens) and transmits the generated screen shot image to the requesting portable terminal.

In an exemplary embodiment of the present invention, the portable terminal B is a requesting portable terminal which requests a screen shot of a screen image of the portable terminal A and an installation file as the user of the portable terminal B desires to install an application; the portable terminal A is a providing portable terminal which provides the screen shot and the installation file in response to the request of the portable terminal B. However, such functions of the portable terminal A and the portable terminal B may also be exchanged.

Thus, in the following description made with reference to FIG. 2, the controllers of the portable terminal A and the portable terminal B correspond to the controller 10 according to an exemplary embodiment of the present invention. Considering this point, detailed operations of the controller 10 according to an exemplary embodiment of the present invention will be described below.

Although devices which can be included in the portable terminal, such as a Bluetooth module, a Global Positioning System (GPS) module, a Near-Field Communication (NFC) module (e.g., a WiFi module), an acceleration sensor, a proximity sensor, a geo-magnetic sensor, a Digital Media Broadcasting (DMB) receiver, etc. are not shown in FIG. 1, a person of ordinary skill in the art should understand and appreciate that devices such as the aforementioned may also be included in the portable terminal to provide corresponding functions.

For example, the acceleration sensor for measuring a dynamic force such as acceleration, vibration, shock, or the like, and the gyroscope for sensing the mechanical movement of the portable terminal may interwork (or separately operate) to recognize user's particular gesture input, and upon recognition of the particular gesture input, a function of transmitting a request for a screen shot of a screen image of another portable terminal is transmitted to another portable terminal and receiving the screen shot from another portable terminal may be automatically executed.

The function of transmitting a request by a user's portable terminal for a screen shot of a screen image of another portable terminal to said another portable terminal and receiving the screen shot from said another portable terminal may be used through an NFC module, and the NFC module may be used to receive an installation file of a particular application from another portable terminal.

Figure 2:
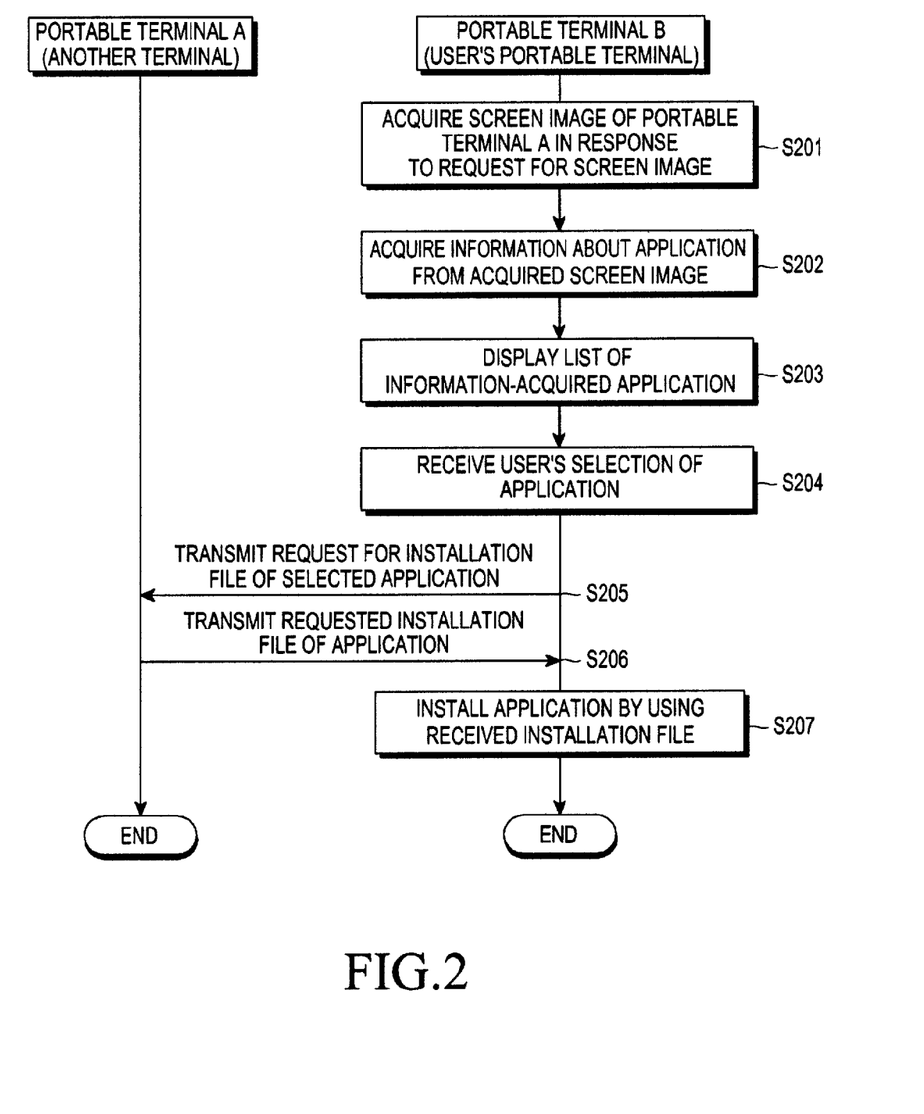
FIG. 2 is a flowchart illustrating a process of installing an application in a portable terminal according to an exemplary embodiment of the present invention.

FIG. 2 is a flowchart illustrating exemplary operation of a process of installing an application in a portable terminal according to an embodiment of the present invention. The exemplary embodiment of the present invention will now be described with reference to FIGS. 2 through 4.

In step S201, the user's portable terminal B senses a user's request for a screen image of the portable terminal A (referred to as another portable terminal) and acquires the screen image of the portable terminal A.

Assuming that a user of the portable terminal B checks icons arranged and displayed on a screen image of the portable terminal A of another user (e.g., a friend of the user of the portable terminal B) and discovers an icon corresponding to an application the user of the portable terminal B needs or is desired, step S201 will be described in more detail.

The user of the portable terminal B may request a screen shot of the screen image on which the icon corresponding to the desired application is disposed (e.g., a screen image which is currently shown or used in the portable terminal A), by inputting a predetermined key or touch or by moving the portable terminal in a predetermined way.

Upon receiving data requesting a screen shot of a predetermined screen image (e.g., a currently shown screen image) from a predetermined portable terminal (e.g., the portable terminal B), the portable terminal A transmits the screen shot of the screen image to the portable terminal B. There may be an authentication or verification process, such as typing in a password, or portable terminal A may be informed there is a request for a screen capture from portable terminal B and prompted as whether or not to approve or deny access. As the portable terminal B receives the screen shot transmitted from the portable terminal A, the user of the portable terminal B may acquire the screen image of the portable terminal A (i.e., provided in the form of the screen shot) on which the icon corresponding to the desired application is disposed.

It should be appreciated in this exemplary embodiment that the user of portable terminal B is not able to view the personal data or application-related personal files that may have been created by use of an application, but rather is permitted to copy only the application.

Figure 3A:
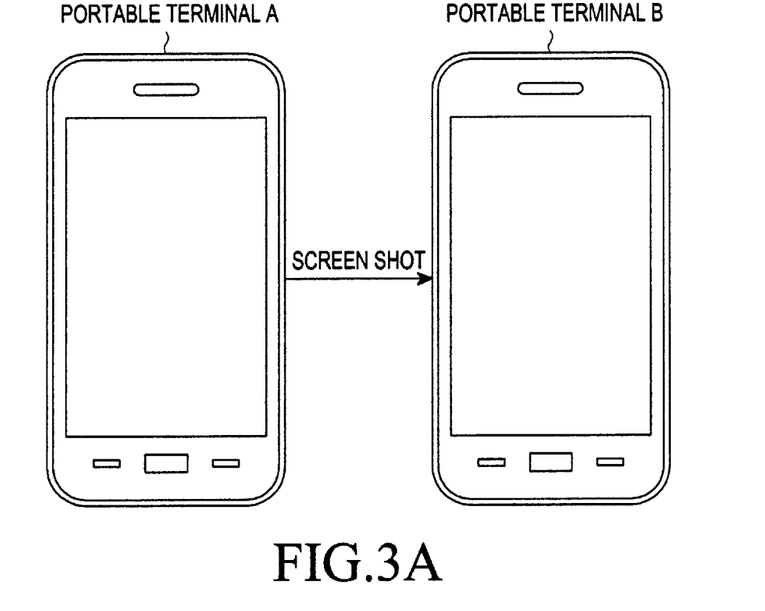
FIGS. 3A and 3B are first exemplary diagrams illustrating a process of installing an application in a portable terminal according to an exemplary embodiment of the present invention.

For example, as shown in FIG. 3A, the portable terminal A, upon receiving a request for a screen shot of a screen image from the portable terminal B, generates the requested screen shot of the screen image in the form of an image file (e.g., a jpg file) and transmits the generated screen shot to the portable terminal B.

According to a modification of an exemplary embodiment of the present invention, the user of the portable terminal B may directly acquire a predetermined screen image of the portable terminal A (e.g., the screen on which the icon corresponding to the desired application is disposed) through the camera module 60, instead of transmitting the request for the screen shot of the screen image to the portable terminal A.

Figure 3B:
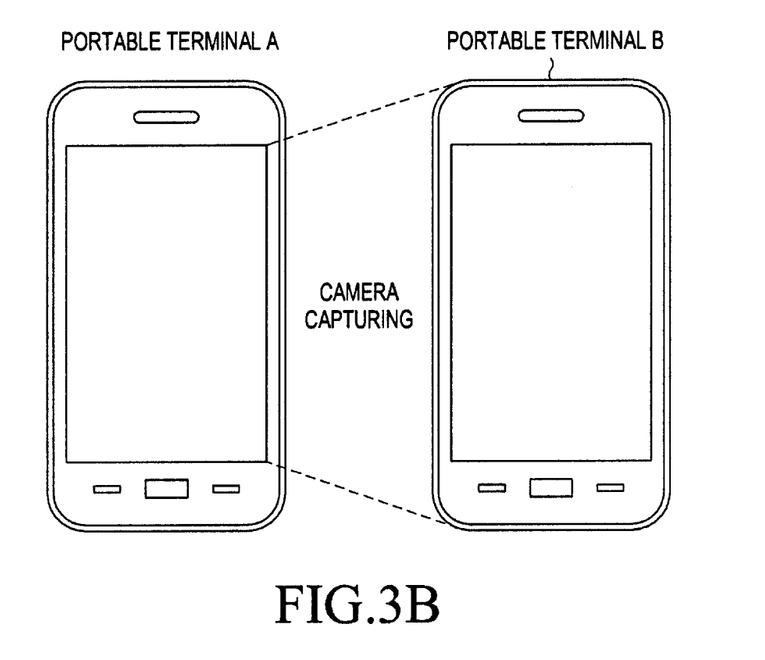

For example, as shown in FIG. 3B, by using the camera module 60, the user of the portable terminal B acquires the screen image of the portable terminal A on which the icon corresponding to the desired application is disposed through a preview screen or a captured image file.

Figure 4A:
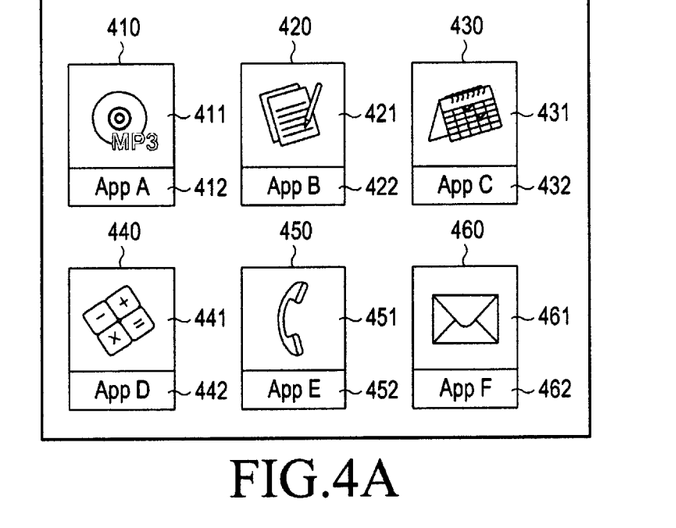
FIGS. 4A and 4B are second exemplary diagrams illustrating a process of installing an application in a portable terminal according to an exemplary embodiment of the present invention.

The screen image of the portable terminal A on which the icon corresponding to the application the user of the portable terminal B desires to install is disposed may be acquired through a screen shot in the form of an image file or through the camera module 60, as shown in FIG. 4A. In other words, the screen shown in FIG. 4A is a screen acquired by the portable terminal B and may have been provided through the screen shot or may have been acquired by checking or capturing the screen image of the portable terminal A on a preview screen and storing the screen image in the form of an image file.

On the screen shown in FIG. 4A are displayed icons 410 through 460 corresponding to applications (i.e. "apps") A through F and at least one of the icons corresponding to applications the user of the portable terminal B desires to install among a plurality of screens of the portable terminal A. In other words, at least one of the icons 410 through 460 displayed on the screen of the portable terminal A corresponds to at least one icons corresponding to applications the user of the portable terminal B desires to install.

Referring back to FIG. 2, in step S202, the portable terminal B acquires information about at least one application from the acquired screen.

As is described in step S201, once the screen image of the portable terminal A on which the icon corresponding to the application the user of the portable terminal B desires to install is disposed is acquired, the controller of the portable terminal B analyzes partial images corresponding to icons on the acquired screen image to acquire information about an application corresponding to each icon (e.g., image and name of the icon corresponding to the application).

Generally, icons displayed on a screen image of a portable terminal are marked with unique image data and application names (or icon names) corresponding to applications from which the user may identify the applications corresponding to the icons. These images and names are often provided by the apps themselves as a default, but can be modified or user-created in some instances. Thus, by using a technique for extracting particular image or text information from an image and characteristics in which icons displayed on the screen image are disposed at predetermined positions of the screen image with predetermined intervals therebetween, the controller of the portable terminal B extracts (or acquires) image data and names of respective icons displayed on the screen image acquired in step S201.

For example, the icons 410 through 460 corresponding to the applications A through F shown in FIG. 4A include image data and application names (or icon names) corresponding to the applications A through F. The icon 410 preferably includes image data 411 and an icon name 412 corresponding to the application A, the icon 420 includes image data 421 and an icon name 422 corresponding to the application B, and the icons 430 through 460 may be understood from the description of the icons 410 and 420.

Referring now back to steps S201 and S202, once the user of the portable terminal B checks the predetermined screen image of another portable terminal (portable terminal A) through the camera module in a preview mode, the controller of the portable terminal B acquires image data and icon names (or text information) of respective icons (e.g., 410 through 460) from the screen image of another portable terminal (e.g., the screen shown in FIG. 4A) displayed on the preview screen.

Alternatively, upon receiving a screen shot of a predetermined screen image (e.g., the screen shot shown in FIG. 4A) from another portable terminal (portable terminal A) at the request of the user, the controller of the portable terminal B (user's portable terminal) acquires image data and icon names (or text information) of respective icons (e.g., 410 through 460) from the received screen shot. The particular way the screen shot itself is created is often device or operating system dependent of the particular device.

Alternatively, when capturing the screen image of the another portable terminal (portable terminal A) through the camera module at the request of the user, the controller of the portable terminal B (user's portable terminal) acquires image data and icon names (or text information) of respective icons (e.g., 410 through 460) from an image file acquired by capturing the screen image.

In steps S203 and S204, the portable terminal B displays a list of at least one or more applications whose information is acquired, and receives user's selection.

Once information about respective applications corresponding to respective icons is acquired by acquiring image data and icon names corresponding to the respective icons displayed on the screen image of the portable terminal A in previous steps, the controller of the portable terminal B displays a list of the applications whose information has been acquired.

Figure 4B:
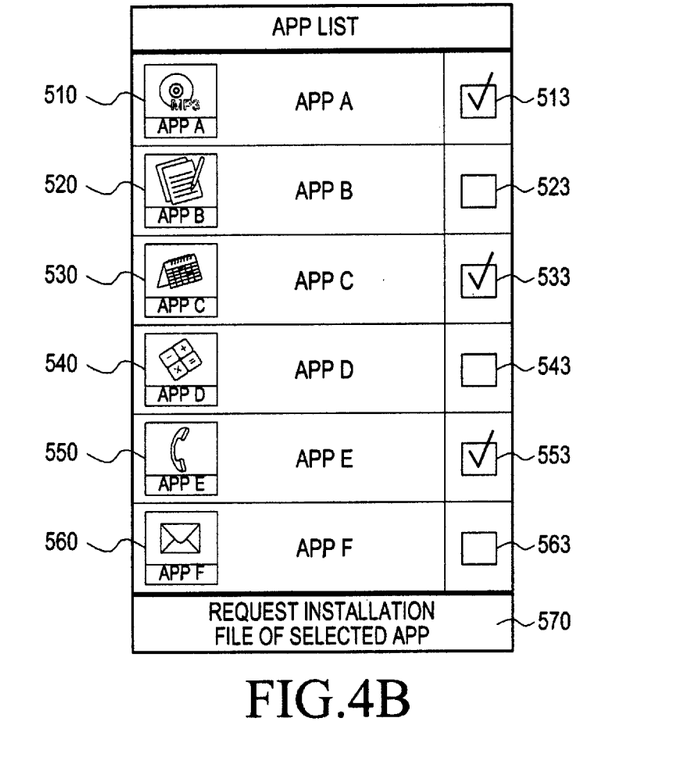

Referring now to FIG. 4B, the controller of the portable terminal B displays a list of the applications A through F corresponding to the icons 410 through 460 shown in FIG. 4A such that the icons 410 through 460 shown in FIG. 4A are displayed with reduced sizes and names of the acquired icons 410 through 460 are displayed together in forms indicated by 510 through 560, thus displaying a list of applications (or icons corresponding to the applications) disposed on the screen image of the portable terminal A acquired in the previous steps on the display unit. Of course, the layout of the applications can be made in many other ways within the spirit and scope of the claimed invention.

Once the list of the applications is displayed, the user of the portable terminal B makes a selection on selection windows ranging from 513, 523, 533, 543, 553, and 563 in this particular example provided together with the listed applications A through F, thereby selecting a desired application.

For example, if the user of the portable terminal B desires to install the application A, the application C, and the application E that are shown in the screen shot or camera image from portable terminal A, the user of the portable terminal B may select them by selection from among the selection windows 513, 523, 533, 543, 553, and 563 provided for the respective applications as shown in FIG. 4B. The user of the portable terminal B selects the selection windows 513, 533, and 553 and makes an input for requesting installation files of the selected applications (e.g., touches 570) to request installation of the application A, the application C, and the application E.

In steps S205 through S207, the portable terminal B requests and receives from portable terminal A an installation file of an application selected to be installed from the displayed list, and then installs the application through the received installation file.

In an exemplary embodiment of the present invention, the installation file of the application the user desires to install may be provided from a portable terminal or an application providing server.

For example, if the portable terminal A and the portable terminal B use an Android® Operating System (OS), the installation file of the application is an app file which is stored in a memory of a portable terminal. Consequently, the controller of the portable terminal B transmits a request for the installation file (e.g., an app file) of the user selected application to the portable terminal A, and the controller of the portable terminal A then transmits the installation file to the portable terminal B in response to the request. For example, the controller of the portable terminal B transmits data requesting installation files to the portable terminal A, together with the icon name App A corresponding to the application A, the icon name App C corresponding to the application C, and the icon name App E corresponding to the application E. In response to the data, the controller of the portable terminal A then transmits the installation files (e.g., app files) of the applications A, C, and E to the portable terminal B, and the controller of the portable terminal B then installs the applications A, C, and E by using the received installation files.

Alternatively, the controller of the portable terminal B transmits information about the user selected application (e.g., an icon name) to a predetermined application providing server (e.g., an Android application providing server), and the server then searches for an application corresponding to the received information and transmits a corresponding installation file to the portable terminal B. The controller of the portable terminal B then installs the application by using the installation file received from the server. This procedure may be advantageous in that the server will typically send the latest updated version of the application, whereas the portable terminal A may not have all of the current updates for security, versions, etc. Optionally, through a user-prompt, the user of portable terminal A can request the server download the specific version of the app on the portable terminal.

According to the exemplary embodiment of the present invention described in steps S201 through S207, when the user discovers a desired application on a screen of a portable terminal currently used by another user, the user may acquire the screen image on which the desired application is disposed and conveniently install the desired application. Therefore, the user can rapidly and conveniently install the desired application without experiencing a cumbersome application search and installation process.

As can be appreciated from the foregoing description, when the user desires to install an application installed on a portable terminal of another user, the user can simply and rapidly install the application without accessing an application providing server, inputting a name of the application to search for the application, and installing the application. The present invention provides a simpler way to install an application than known heretofore.

Thus, a system according to the present invention can be embodied in different types of wireless devices, such as portable communication terminals, computers (as previously define above) multimedia players, etc.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A method for installing an application in a portable terminal, the method comprising:
   acquiring by a first portable terminal a screen image of a second portable terminal and acquiring information about at least one application from the acquired screen image;
   displaying by a display unit of the first portable terminal a list of the at least one application whose information is acquired, and requesting and receiving from the second portable terminal an installation file of an application selected from the displayed list; and
   installing by a controller the selected application by using the received installation file,
   wherein the acquiring of the information about the at least one application comprises:
   acquiring identifying information of respective icons corresponding to the at least one applications displayed on the acquired screen image.

2. The method of claim 1, wherein the acquiring of the screen image comprises:
   upon the first terminal receiving a predetermined input, transmitting, by the first portable terminal, a request for a screen shot of a predetermined screen image to the second portable terminal; and
   transmitting, by the second portable terminal, the requested screen shot of the screen image to the first portable terminal in response to the request, and acquiring the transmitted screen shot by the first portable terminal.

3. The method of claim 1, wherein the acquiring of the screen image comprises:
   capturing, by the first portable terminal, a predetermined screen image of the second portable terminal and acquiring the captured screen image.

4. The method of claim 1, wherein the acquiring of the screen image comprises:
   checking, by the first portable terminal, a predetermined screen image of the second portable terminal through a camera module in a preview mode, and acquiring the screen image checked in the preview mode.

5. The method of claim 1, wherein the identifying information comprises names.

6. The method of claim 1, wherein the acquiring of the information about the at least one application comprises:
   acquiring image data of respective icons corresponding to the at least one application displayed on the acquired screen image.

7. The method of claim 1, wherein the receiving of the installation file comprises:
   transmitting, from the first portable terminal to the second portable terminal, a request for an installation file of the selected application; and
   upon transmitting, by the second portable terminal, the requested installation file to the portable terminal of the user, receiving, by the portable terminal, the requested installation file.

8. The method of claim 6, wherein the installation file is an apk file used in an Android Operating System (OS).

9. The method of claim 1, wherein the receiving of the installation file comprises:

transmitting, by the first portable terminal, the information about the selected application to a predetermined application providing server; and upon transmitting, by the application providing server, an application corresponding to the information about the selected application, receiving, by the first portable terminal, the installation file of the selected application.

10. The method of claim 9, wherein the information about the selected application comprises a name of an icon corresponding to the selected application.

11. The method according to claim 1, wherein the second portable terminal upon request for transmitting an application from the first portable server, communicates with an application providing server to determine whether the requested application has any updates available that are downloaded to the second portable terminal and transmitted to the first portable terminal.

12. The method according to claim 1, wherein the first portable terminal and the second portable terminal communicate via a near field communication protocol.

13. A portable terminal that views and installs an application that is already-installed on another portable terminal, said portable terminal comprising:

a near field communication interface in which the portable terminal and a another portable terminal exchange screen images containing application icons;

a memory storing at least one application;

a display unit that displays from a screen image acquired from said another portable terminal; and a controller that controls display by the display unit a list of said at least one application whose information is acquired from said screen image, and requests and receives from said another portable terminal an installation file of an application selected from the displayed list, wherein the controller controls installation of the selected application by using the received installation file, and wherein the acquiring of the information about said at least one application comprises: acquiring identifying information of respective icons corresponding to said at least one applications displayed on the acquired screen image.

14. The portable terminal according to claim 13, further comprising a camera module that obtains a screen image of a screen of said another portable terminal and a camera controller provides the image to the controller for display by the display unit.

15. The portable terminal according to claim 13, wherein the screen images are acquired by the portable receiving a screen shot from said another portable terminal in response to a request made by the portable terminal.

16. The device according to claim 13, wherein the controller controls display of a selection screen for requesting transfer of applications from said another portable terminal.

17. The device according to claim 13, wherein the identifying information comprises names.

* * * * *

UNITED STATES PATENT AND TRADEMARK OFFICE
CERTIFICATE OF CORRECTION

PATENT NO.         : 8,732,691 B2
APPLICATION NO.    : 13/528928
DATED              : May 20, 2014
INVENTOR(S)        : Sung-Hak Ryu et al.

Page 1 of 1

It is certified that error appears in the above-identified patent and that said Letters Patent is hereby corrected as shown below:

In the Claims:

Column 10, Claim 1, Line 23 should read as follows:
--...one application displayed on...--

Column 11, Claim 13, Line 25 should read as follows:
--...terminal and another portable...--

Column 12, Claim 13, Line 12 should read as follows:
--...least one application displayed...--

Signed and Sealed this
Fifth Day of August, 2014

Michelle K. Lee
*Deputy Director of the United States Patent and Trademark Office*